(12) United States Patent
Santos (10) Patent No.: US 8,441,358 B2
(45) Date of Patent: May 14, 2013

(54) TEMPERATURE MONITORING SYSTEM FOR POWER TRANSFORMERS SUBMERGED IN OIL

(76) Inventor: Eduardo Pedrosa Santos, Atibaia (BR)

( * ) Notice: Subject to any disclaimer, the term of this patent is extended or adjusted under 35 U.S.C. 154(b) by 527 days.

(21) Appl. No.: 12/531,623

(22) PCT Filed: Mar. 3, 2008

(86) PCT No.: PCT/BR2008/000057
§ 371 (c)(1),
(2), (4) Date: Sep. 16, 2009

(87) PCT Pub. No.: WO2008/113143
PCT Pub. Date: Sep. 25, 2008

(65) Prior Publication Data
US 2010/0109883 A1  May 6, 2010

(30) Foreign Application Priority Data
Mar. 20, 2007 (BR) .................................. 0700843

(51) Int. Cl.
*G08B 17/00* (2006.01)
(52) U.S. Cl.
USPC ................................................ 340/584
(58) Field of Classification Search .......... 340/584, 340/646, 588, 643; 336/55
See application file for complete search history.

(56) References Cited

U.S. PATENT DOCUMENTS

| | | | |
|---|---|---|---|
| 4,754,405 A * | 6/1988 | Foster | 700/299 |
| 6,052,060 A * | 4/2000 | Butler et al. | 340/644 |
| 6,401,518 B1 * | 6/2002 | O'Keeffe et al. | 73/19.01 |
| 6,842,718 B2 * | 1/2005 | Byrd et al. | 702/182 |
| 6,906,630 B2 * | 6/2005 | Georges et al. | 340/646 |
| 7,516,651 B2 * | 4/2009 | Aubin et al. | 73/73 |
| 2004/0159146 A1 * | 8/2004 | Belanger | 73/73 |

* cited by examiner

*Primary Examiner* — Phung Nguyen
(74) *Attorney, Agent, or Firm* — McKee, Voorhees & Sease, P.L.C.

(57) ABSTRACT

Temperature monitoring system for power transformers submerged in oil applied preferentially in transformers submerged in oil and it presents several facilities in the sense of becoming temperature monitoring more reliable and safe, with highlight for the redundant measurement of temperature of the top of the oil; self-calibration of the temperature measurement entrances by means of internal references and specific electronic circuits; timing between successive activation of the groups of forced cooling when the deactivation of monitoring system on screen; internal watches with auxiliary alimentation without battery; safety reinforced in the alarms signaling for elevated temperature and finally automatic adjustment of the alarm values of the temperature differential of the commuter of derivations in load.

26 Claims, 2 Drawing Sheets

TEMPERATURE MONITORING SYSTEM FOR POWER TRANSFORMERS SUBMERGED IN OIL

BRIEF INTRODUCTION

The present request of Patent of Invention refers to a new "TEMPERATURE MONITORING SYSTEM FOR POWER TRANSFORMERS SUBMERGED IN OIL"; notedly of a system that offers a series of facility that guarantee larger reliability and safety of operation related to the monitoring of temperature of this kind of equipment; with highlight for the redundant measurement of temperature of the top of the oil, having two temperature sensors; self-calibration of the temperature measurement entrances by means of sensors that send signals for specific electronic circuits; timing between successive activation of the forced cooling groups when of the deactivation of said monitoring system; internal watches with auxiliary alimentation by "super capacitors"; alarms signalling of elevated temperature accomplished by two microcontrollers that change information to each other through photocouplers and finally automatic adjustment of the alarm values of the temperature differential of the Commuter of Derivations in Load (CDC).

BACKGROUND OF THE INVENTION

The transformers and reactors of power are equipments broadly used in systems of generation, transmission and distribution of electric power of average, high and extra-high tension.

These equipments generally use as insulating and of heat transfer ways, some kind of oil, which can be mineral, petroleum derivative, vegetable, silicone-based and so many another.

Such equipments are mounted in tanks and are provided of a nucleus, which constitute in magnetic plates, on which are mounted several coilings, such as primary, secondary and tertiary. The set nucleus more coilings is denominated active part, and works completely immersed in insulating oil, which should have its temperature supervised or monitored constantly, together with the temperature of the coilings.

Some transformers also have several intermediary derivations in their coilings, usually denominated "taps", which allow the selection of the wished transformation relation between primary and secondary of the transformer, enabling thus the regulation of the exit tension of the transformer. The selection of tap to be used is made by a denominated equipment "Commuter of Derivations in Load" or "Commuter Under Load", herein referred just as "commuter", which is able to make tap change with the energized transformer and without interrupting the chain supply for the load. Also the commuter operates immersed in insulating oil, however in a compartment separated of the oil of the transformer in order to avoid the contamination of that, since in the tap change operations the contacts of the commuter interrupt electric arcs that deteriorate gradually the oil in which they are immersed.

STATE OF THE TECHNIQUE

To allow its secure operation, the power transformers are equipped with devices for thermal supervision, with the objective of controlling automatically the system of forced ventilation, alert the operator in case of high temperatures and to make the emergency disconnection of the transformer in case of extreme temperatures.

These devices of thermal supervision usually make the measurement of the temperature of the top of the oil, obtained through a sensor installed in the cover of the transformer, region where usually is the hottest oil, and also the temperature of the coilings, obtained from indirect form due to the difficulty in install sensors in this region, because of the elevated electric potential of the coiling related to mass.

The sensor used for temperature measurement of the top of the oil generally is a sensor of variable resistance RTD type (for example, Pt100 ohms to 0° C.) installed in the cover of the transformer. This sensor is connected for circuits in a measurement entrance in the temperature monitoring system that measure the electric resistance of the sensor, reading that is further converted in the value of corresponding temperature. Monitoring systems of existing temperature have means to make the calibration of this measurement, such as through variable resistors (trimpots) or by software, using in any of the cases an external pattern as reference for the calibration The temperature of the coiling is obtained by calculation or simulation, basing on temperature of the oil summed to an elevation or gradient of temperature that is calculated with base in the load chain of the transformer.

From the value obtained for the temperature of the coiling, the temperature monitoring system makes the automatic command of the forced cooling system of the transformer, which is formed by heat radiators or dressing rooms equipped with fans for forced circulation of air and/or bombs for forced circulation of the insulating oil. The fans and/or oil bombs are generally divided into two groups, so that a group enters operation automatically when the temperature reaches determined landing, and other group is activated when the temperature increases more, reaching a superior landing.

When the forced cooling is commanded in the automatic way above described, the refrigeration groups are activated in a sequential way like increases the temperature. This fact introduces as a consequence the unlike use of the equipments of each group, once that those activated to smaller temperatures will operate for more time that the activated to largest temperatures. Or still in a worse condition, in which some cooling groups never will act, depending on conditions of ambient temperature and shipment of the transformer. To avoid this occurrence, generally it is included in the activation circuit of the refrigeration groups a manual selector key, which allows inverting the activation order of the groups. To be effective, the position of this key should be inverted manually by the operator from time to time The temperature monitoring system has an exit contact for the automatic activation of each refrigeration group, contacts that are never closed simultaneously, but always with a compulsory interval in order to avoid that all the motors be energized at the same time, what it would cause a elevated departure chain.

To increase the safety of the operation, the exit contacts of the temperatures monitoring system for activation of the refrigeration groups generally are of an Usually Closed type (NF), of a way that in failure case in the temperatures monitoring system, or in case of auxiliary alimentation lack for that system, groups of forced refrigeration will be activated, reducing the risk of over heating of the transformer while monitoring system is out of operation.

Equally important in the transformers is the monitoring of the oil temperature of the compartment of the commuter under load. As in normal conditions of operation the commuter is not an important source of heat, the oil temperature of the commuter will tend to be alike or lightly smaller than the oil temperature of the transformer, accompanying the variations of that. For this reason, the thermal supervision of the commuter is made through the calculation of the temperature difference between commuter and transformer. In normal conditions this differential will be next to zero, and in case of a thermal defect in the commuter this differential will increase. It is fitting then a limit value for this differential, which if overtaken will activate an alarm indicating possible defects in the commuter.

The temperature monitoring systems frequently have an internal watch, which supplies referenced date and schedule information for several ends, as, for instance, periodic records in memory of the temperature measurements and of the occurrence in events (alarms disconnections, activations of the forced cooling, and others). During the normal operation of the temperature monitoring system, the necessary energy for the operation of the watch is provided by own auxiliary tension with which is fed monitoring system. However, when of the referred alimentation lack, it is necessary to keep the watch in operation, in order to avoid the same has to be hit in the return of the energy. This task is generally guaranteed by use of an internal battery in the temperature monitoring system.

The systems nowadays used to the monitoring of temperatures in transformers have some inconvenient, which are:

They use only a sensor for measurement of the temperature of the top of the oil, what it obliges, in defect case in this sensor, to the retreat of the service transformer, because the sensor is installed in the cover of the transformer, region with risk of electric discharge due to the proximity with the high tension conductors. This disconnection of the transformer just for repair in a temperature sensor can carry elevated costs for the owner of the transformer, be for revenue loss during the disconnection of the transformer, be for stop of the production in industries that depend on the electric power, be for penalties imposed by government regulators agencies.

The measurement circuits of the temperature sensors of the oil need to be calibrated periodically to make the resistance reading with the required precision, what it consumes time of the maintenance people and obliges the periodic disconnections of the transformer for calibration, carrying the costs described in the previous item.

In case of a defect in the temperature sensor of the oil, as a bad operation in the sensor that causes increase in your resistance, that increase will be interpreted as if it was a temperature increase, provoking incorrect measurement of the temperature of the top of the oil, what it can carry for false alarms or even untimely and unnecessary disconnection of the transformer, causing interruption in the electric power and great prejudices supply.

In case of failure in the temperatures monitoring system, or in case of auxiliary alimentation lack for that system, the exit contacts for activation of groups of forced refrigeration will be closed simultaneously, since they are of NF kind, causing the simultaneous departure of all the refrigeration groups, what it carries a departure elevated chain of the motors that can provoke the disconnection of protection circuit breakers of this circuit. To avoid that, it is compulsory the use of relays of external timing in the temperatures monitoring system.

In substations non-assisted, where there is not a present operator, or still if the operator forget to change the position of the selector key that inverts the activation order of the groups of forced refrigeration, these groups will be used of unlike form, what it can carry several inconvenient, such as the excessive and precocious waste of some fans and bombs while others remain without use. It can occur also problems associated to the inactivity for long periods of the equipment that stay without operating, just as the drying of the lubricant grease.

The battery used internally to the temperature monitoring system to keep the hit of the watch in case of auxiliary tension lack must to be obligatorily substituted at the end of its useful life or next to it. That aggregates costs as work hand used in the maintenance substitution and costs, mostly in facilities in remote locations and without the presence of an operator, considering although this operation will be able to demand the service retreat of the transformer, since the monitoring of temperature will be inoperative.

The temperature monitoring systems are equipped with several exit contacts, used mostly for the signalling of current alarms of high temperatures; activation of the groups of forced cooling and for disconnection of the transformer for very high temperatures. The maid solution nowadays in existing systems for activation of these exit contacts generally consists in the use of an exit pin of the microprocessor or microcontroller associated to each exit contact, taking over this pin a certain logical level (generally 1) for the condition of closed contact and the logical level opposite (generally 0) for the contact condition of open. This solution introduces some deficiencies with regard to the reliability of the temperature monitoring system against improper activations of these contacts; especially the contacts for disconnection of the transformer, which if activated can improperly cause interruption in the electric power supply, with financial and social prejudices. In the existing, eventual systems external interferences (tension surges, intense electromagnetic field, extreme temperatures) or even internal defects to the microprocessor (or microcontroller) can lock it and change improperly the logical level of its exits, causing activation of the contacts associates to them.

The adjustment of the alarm value for the temperature differential of the commuter under load is generally made of empiric form, observing the maximum values reached by the differential during CDC's normal operation and summing to these maximum values a tolerance margin to avoid false alarms. This alarms adjustment system introduces the disadvantage of demanding that the user observes for time's certain period, which it can arrive to weeks, the behavior of the temperature differential under normal conditions of operation of the commuter, of form to obtain the fittings of the alarms. This task consumes a great quantity of time when it has to be made in companies that operate hundreds of transformers.

OF THE NEW INVENTION

Thinking of inconvenient supplies cited, the inventor, person acting in the electric power sector, created the system in subject that comes to turn more reliable for monitoring of temperature in immersed transformers in oil, supplying the current deficiencies with regard to the inconvenient fully illustrated in the state of the technique.

Concisely the system is based on monitoring of temperature; with highlight for the redundant measurement of temperature of the top of the oil, for allowing the use of two temperature sensors; self-calibration of the temperature measurement entrances by means of internal references that send signals for specific electronic circuits; timing between successive activation of the groups of forced cooling when of the deactivation of monitoring system on screen; internal watches with auxiliary alimentation by means of "super capacitors"; alarms and disconnections signallings for elevated temperatures accomplished by two microcontrollers that change information to each other; special algorithm for confirmation of the need to disconnection of the transformer for about-temperature; and finally automatic adjustment of the alarm values of the temperature differential of the Commuter of Derivations in Load.

OF THE ADVANTAGES OF THE NEW INVENTION

The proposed system provides a larger reliability in the temperature measurement, since any problem in any of the temperature sensors can be quickly detected, considering that is very low the probability that both sensors present problems simultaneously, and also considering that although both present problems simultaneously it is very low the probability that these problems be of same magnitude;

The proposed system enables larger availability of the temperature monitoring system and reduction of the number and time of interruptions in the operation of the transformer, since in case of defect in one of the sensors the measurement of this sensor can be disregarded and the temperature monitoring system continue in normal operation using only a sensor until it is possible the repair of the defective sensor, could the repair wait until there is some programmed disconnection of the transformer for any other motivate, given to small probability that the second temperature sensor also presents some defect in a time's short space;

Due to the auto-calibration resource, it there is no need to manual calibration of the measurement, be in the production process or during the operation, avoiding the eventual mistakes introduction by the person who makes the calibration, avoiding the time's expense of the maintenance people and also avoiding disconnections of the transformer for this task;

Still due to the auto-calibration resource, automatic annulment of mistakes inserted in the measurement along time due to the natural process of waste and aging of electronic components, eliminating thus the need of periodic calibrations of the temperature monitoring system.

Timing warranty between successive activation of the groups of forced cooling when of desenergizing of the temperature monitoring system, even using contacts of NF the for activation of the cooling groups.

Uniform use of the oil fans and bombs of the several groups of forced cooling, through the automatic alternation in the order of operation of these groups.

Utilization of super-capacitors for maintenance of the watch in case of alimentation tension lack eliminates the need to periodic maintenance in the temperature monitoring systems with the change of internal batteries purpose, with reduction in the workmanship and in the maintenance costs.

High reliability in the activation of the alarm exit contacts and automatic disconnection of the transformer for over-temperature, without risk of improper performances for internal defects or external interferences to the temperatures monitoring system.

The calculation of the average of the temperature differential of the commuter under load allows eliminating eventual increases of short duration in the temperature differential, caused, for instance, by the entrance in operation of the forced ventilation of the transformer, avoiding of this way the emission of false alarms for differential of elevated temperature.

Automatic adjustment of the alarm values for elevated temperature differential between commuter under load and transformer, avoiding expense of time of the maintenance people to make these fittings.

To follow, the invention will be explained in details through the related drawings below.

DETAILED DESCRIPTION

"TEMPERATURE MONITORING SYSTEM FOR POWER TRANSFORMERS SUBMERGED IN OIL", object of this Patent of Invention solicitation, applied preferentially in transformers submerged in oil, presents several facility in the sense of becoming temperature monitoring more reliable and safe.

Figure 1:
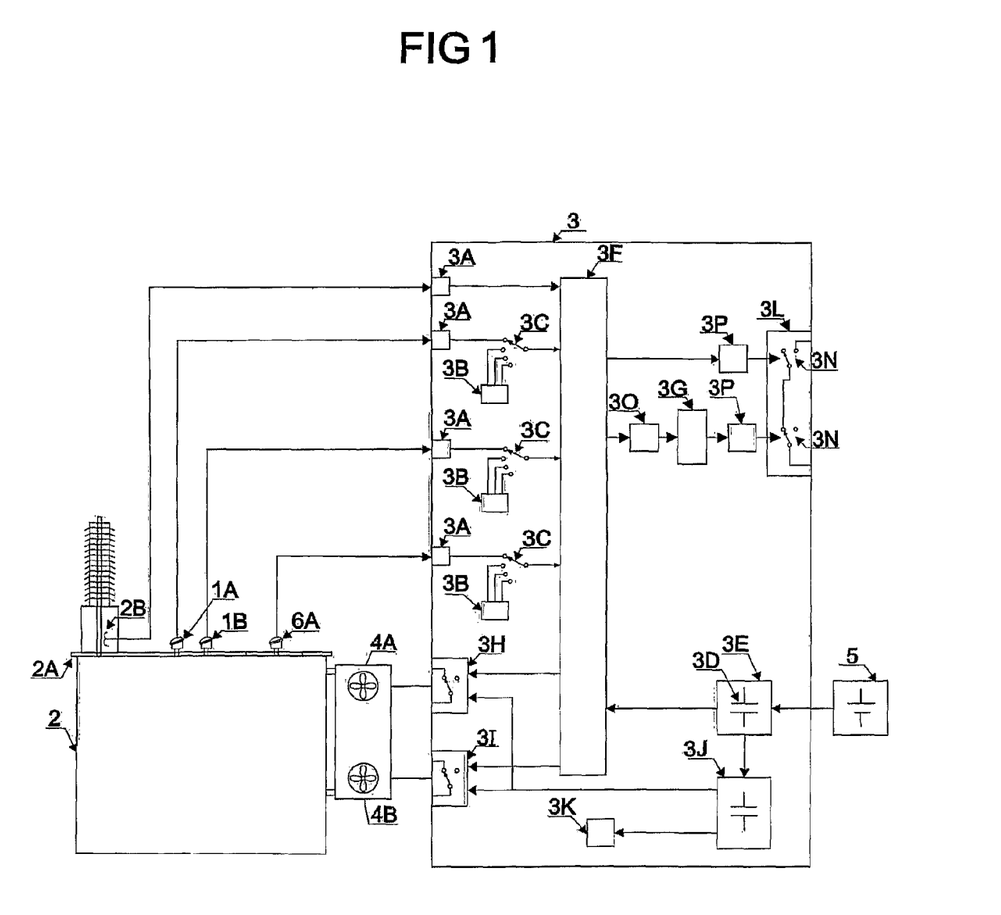
FIG. 1—Diagram of blocks of the new temperature monitoring system for transformers submerged in oil.

The requested system, as illustrates the FIG. 1, it is redundant for temperature measurement of the top of the oil, through two sensors (1A and 1B) of temperature of RTD (resistive temperature detector) kind nearby installed each other in the cover (2A) of the transformer (2), which are linked to two entrances (3A) of independent measurement in the Temperature Monitor (3). In normal conditions of operation, both sensors (1A and 1B) measure about the same temperature and it is considered as temperature of the oil the arithmetic average of the measurements of the two sensors. It is programmed in the Temperature Monitor (3) the admissible maximum value for the temperature difference of the two sensors (1A and 1B); if the difference in the measurement of the two sensors is overtaken it is considered that there are problems in the measurement of one of the sensors (1A or 1B).

Still according to FIG. 1, the entrance (3A) of measurement of the temperature monitor (3) has a self-calibration system, based on utilization of internal patterns of calibration to the temperature monitor (3) which consist in resistors (3B) of high precision and stability with known values of resistances, each one of them (3B) corresponding for temperature values distributed inside the measurement scale of monitoring system. The toggling system (3C) transfers periodically the temperature measurement of the temperature sensors (1A and 1B) for these calibration resistances (3B), comparing the measurement made in the calibration resistances (3B) with the known value well them, adjusting thus the measurement to the real value of the calibration resistances (3B).

Still as the FIG. 1, the temperature monitoring system (3) here described has an innovative timing system between activation of the cooling groups (4A and 4B), able to avoid the simultaneous activation of these in case of internal failure or alimentation lack. Such system guarantees the activation of the second group (4B) with retard of some seconds regarding the first group (4A). Capacitors (3D) of the internal alimentation supply (3E) of the temperature monitor (3) makes, in case of lack of external alimentation (5), the tension of internal alimentation of microcontroller (3F) decrease gradually, allowing microcontroller (3F) detect the alimentation lack (5) before the internal tension lacks completely. At this time, microcontroller (3F) immediately activates the first ventilation group (4A), turning off the bobbin of the relay (3H) correspondent, and it keeps the second ventilation group (4B)

turned off to keep the bobbin of the relay (3I) energized, being the necessary chain for this supplied by one super capacitor (3J), which has capacity enough to keep the relay (3I) energized for several seconds. As this super capacitor (3J) also has for function to keep the date and schedule fittings of the internal watch (3K) of the equipment (3), the super capacitor (3J) can not be totally unchanged. Therefore, after desenergizing the relay (3I) of the second group (4B) of ventilation, microcontroller (3F) comes in low consumption way ("sleep" way).

Still according to FIG. 1, the temperature monitor (3) also has an innovative system of automatic alternation of the groups (4A and 4B) of forced cooling, able to guarantee the uniform use of the cooling equipment without the need of operators' human intervention. This system consists of an activation algorithm of the cooling that:

Every time the groups (4A and 4B) of forced cooling are linked, after have being turned off, the activation order of the cooling groups is inverted, considering a system with just two cooling groups.

In a system with more than two groups (4A and 4B) of forced cooling, the sequential activation of the groups initiates, after have being turned off, by the subsequent group to that had been the first to be activated in the previous time, in a cyclic process.

In cases in which the groups (4A and 4B) of cooling remain constantly linked by long periods, not occurring therefore the turn on/off cycles described in the two previous cases, it is kept a record of operation time of each group (4A and 4B) of cooling, giving priority to the activation of the group with smaller time of operation in substitution to the group with larger time of operation.

For being just activated when the temperature if elevated, the groups of forced cooling (4A and 4B) can remain during long periods outside operation in transformers that operate in reduced loading conditions. This condition can result in damages to the fans and bombs, for instance, by the drying of the lubricant grease. To avoid this condition, the temperature monitoring system (3) has the denominated function Fans Exercise, which consists in the programming by user of schedule for the beginning of the operation of the cooling groups (4A and 4B), as well as days of week in which this operation should occur and the total time, in minutes, which the cooling groups should remain in operation.

Still according to FIG. 1, the temperature monitoring system (3) has an innovative system for maintenance of the watch (3K) in case of auxiliary alimentation lack (5), without the use of internal batteries to the equipment. This system is based on use of the thus denominated "super capacitors" (3J) which are capacitors with high capacity of energy storage, able of supply the necessary energy to keep the watch (3K) in operation during the fault of the auxiliary alimentation assist (5). Time during which the watch (3K) will be kept in operation will vary according to the capacity of this super capacitor (3J), could be easily scaled for several days or weeks, time enough taking in consideration the fact that the temperature monitoring systems (3) is fed with auxiliary (5) of high reliability, originating generally of batteries banks of the substation, so that the interruptions in the alimentation will be rare and of short duration. The innovative maintenance system of the watch (3K), as described above, it applies not only for temperature monitoring systems (3), but also to any system in which are necessary the maintenance of the watch (3K) during the auxiliary alimentation tension temporary fault (5), without aggregating to the system elements that require change or maintenance from time to time, as, for instance, batteries.

The temperature monitoring system (3) here described has an innovative system to increase the reliability and the safety in the activation of the exit contacts (3L) for alarm and disconnection functions for over-temperature, which consists:

According to FIG. 1, in the utilization of two microcontrollers (3F and 3G), denominated "principal" (3F) and "secondary" (3G), electrically isolated, however making data change to each other by means of photocouplers (3O).

Each exit contact (3L) of the temperature monitoring system (3) consists, internally, of two relays (3M and 3N) with their contacts connected in series, being a relay (3M) controlled by principal microcontroller (3F) and the other relay (3N) by secondary microcontroller (3G), so that the shutdown of just one of these relays (3M or 3N) is not enough to cause the shutdown of the exit contact (3L).

Of this way, a failure in the operation of just one of microcontrollers (3F or 3G) is not enough to cause an improper operation of the exit contacts (3L), avoiding thus alarms or improper disconnections.

Figure 2:
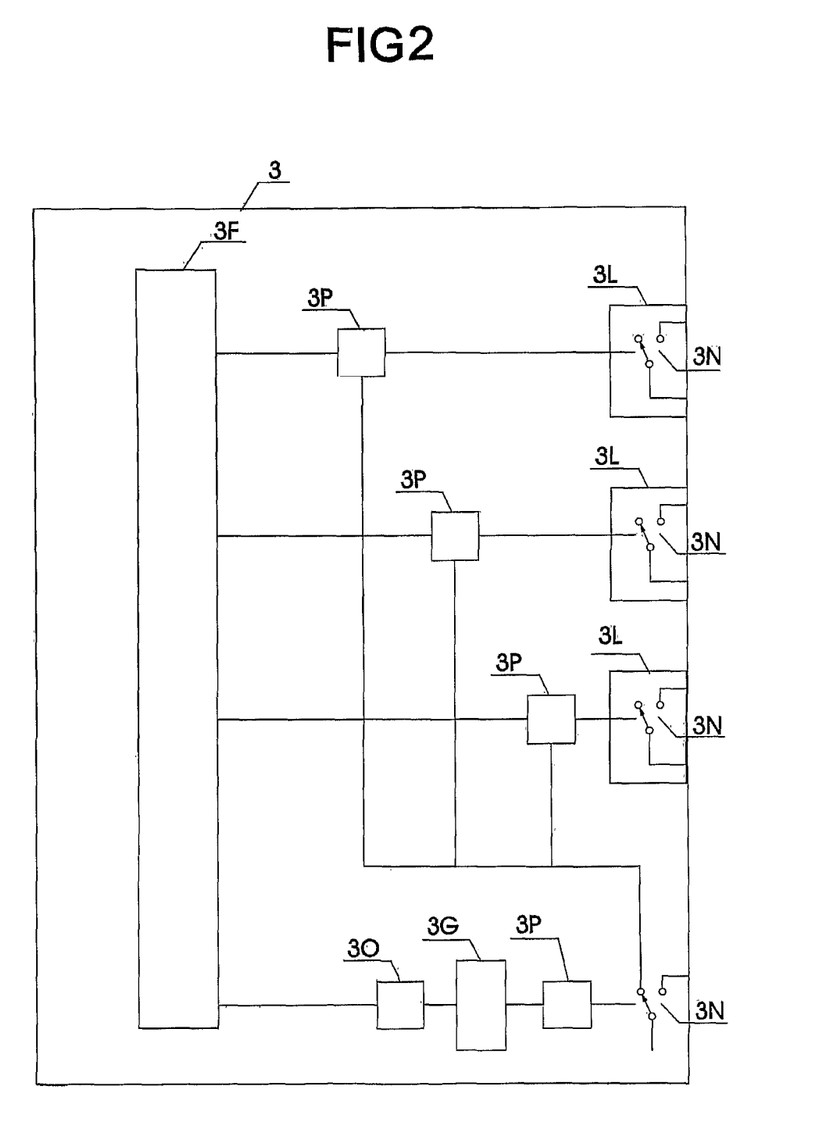
FIG. 2—Alternative configuration for safety in the activation of the relays of alarm and disconnection.

Alternatively, as it shows the FIG. 2, it can be used an economic topology, in which secondary microcontroller (3G) only activates a relay (3N) whose contact, when closing, provides the alimentation tension that will allow to the principal microcontroller (3F) energizing the bobbins of several exit relays (3M). This topology allows to obtain the same result regarding the safety and reliability in the activation of the exit contacts (3L), however it avoids the duplication in the number of relays used internally in the temperature monitoring system (3).

As FIG. 1 shows, in the utilization of circuits (3P) especially projected in the connection of each exit of microcontrollers (3F and 3G) to the bobbin of the relays (3M and 3N), circuits (3P) that not energize the bobbins of the relays (3M and 3N) in case of logical level of the exit of microcontrollers (3F and 3G) be continually in 0 or 1. These circuits (3P) only energize the bobbins of the relays (3M and 3N) in case they are present in the exit of microcontroller (3F and 3G) a logical level that if alternate continually between 1 and 0 to a frequency predetermined, condition this one that only can be obtained if microcontroller (3F and 3G) is usually operating (because in case of microcontroller crash, its exits will be in 0 or 1 permanently).

In the reciprocal verification of operation that each microcontroller (3F and 3G) makes in the another—principal microcontroller (3F) verifies the secondary (3G), and the secondary (3G) verifies the principal (3F)—, detecting through the change of eventual data failures in the operation. Once detected a failure, microcontroller (3F or 3G) which detected it, makes the "reset" from other microcontroller (3F or 3G) through a signal sent through a photocoupler (3O). The circuits can be configured so much to make the "reset" by means of own entrances for this existing function in microcontrollers (3F and 3G) how much through outline for temporary interruption of the alimentation of microcontroller.

The innovative system for increase of the safety and reliability in the exit contacts activation (3L), as described above, it applies not only for temperature monitoring systems (3), but also to any system based on microcontrollers or microprocessors in which is larger necessary safety in the exit contacts activation.

The temperature monitoring system (3) makes also, as illustrated in the FIG. 1, the measurement of the load chain of the transformer (2), through a chain transformer (2B) installed in one of the wads of the transformer that is connected to the measurement entrance (3Q) in the temperature monitor (3). Through of this measurement, the temperature monitoring system (3) executes a consistency verification algorithm of the temperature measurements. Such algorithm bases on fact that the temperatures of the oil and of the coilings of the transformer (2) will be determined mostly by the load chain of the transformer, and also in smaller scale by the ambient temperature. Therefore, this algorithm will consider that a measurement of elevated temperature, above of the limits for performance of the alarm contacts and/or disconnection for over-temperature, it can only be considered true if the load chain of the transformer is above a minimum landing programmed by user. Otherwise, the algorithm will indicate that the measurement of high temperature is inconsistent, and it will block the activation of the exit contacts for alarm and/or disconnection of the transformer.

Additionally, the consistency verification algorithm can base not only in the instantaneous measurement of the load chain, but also in the calculation of the average of this current in a window of mobile time programmed by user. Thus, a measurement of elevated temperature, above of the limits for performance of the alarm contacts and/or disconnection for over-temperature, it can only be considered true if the average calculated for the load chain of the transformer is above a minimum landing programmed by user. Otherwise, the algorithm will indicate that the measurement of high temperature is inconsistent, and it will block the activation of the exit contacts for alarm and/or disconnection of the transformer.

Still based on load chain measurement made in its entrance (3Q), the temperature monitor (3) also has the algorithm of Pre-Cooling. Initially, the measure load chain is divided by the nominal chain of the transformer and multiplied by 100%, obtaining thus the percentile of current loading of the transformer regarding its nominal chain. Soon after, for each cooling group (4A and 4B) is fitting of independent form a landing of percentile load that, when overtaken by the percentile of current load, it provokes the entrance in operation of the cooling referred group. Due to the elevated mass of oil, of the nucleus and of the coilings of the transformer (2), the same has a great thermal inertia, so that the procedure allows the cooling groups (4A and 4B) be placed in operation before even though the temperature reaches elevated values, accomplishing thus it pre-cooling of the transformer (2), decreasing your average temperature of operation and contributing for the increase of its useful life.

The algorithm of Pre-Cooling still allows the adjustment by user of a hysteresis value for the stop of the cooling groups (4A and 4B), which only are turned off if the current percentile loading of the transformer (2) is reduced to a value lower than the adjustment for entrance in operation of the cooling group less the value of hysteresis. Thus it is avoided that small variations of the percentile of load provoke successive departures and stopped of the cooling groups (4A and 4B).

Described monitoring system of temperature allows as well, as illustrated in the FIG. 1, the temperature measurement of the commuter under load (6) through a sensor (6A) installed in the cover of the commuter (6), in touch with the insulating oil. As in normal conditions of operation the commuter (6) is not a source of important heat, the temperature of the oil of the commuter (6) will tend to be alike or lightly smaller than the temperature of the oil of the transformer (2), accompanying the variations of this. For this reason, the thermal supervision of the commuter is made through the calculation of the temperature difference between commuter and the transformer. In normal conditions that differential will be next to zero, and in case of a thermal defect in the commuter that differential will increase. It is fitting then a limit value for that differential, which if overtaken will activate an alarm indicating possible defects in the commuter.

Besides the calculation of the instantaneous value of the temperature differential between commuter (6) and the transformer (2), the temperature monitoring system (3) also makes the calculation of the average of the temperature differential in a window of mobile time, that is, a interval time programmed by user. The calculation of the average of the temperature differential of the commuter under load allows eliminating short duration eventual increases in the temperature differential, caused, for instance, by the entrance in operation of the forced ventilation of the transformer. It is programmed a limit value for the average of the temperature differential, avoiding of this way the emission of false alarms for differential of elevated temperature.

The temperature monitoring system (3) here described has an innovative system for automatic adjustment of the alarm values of the temperature differential of the commuter (6), which consists in:

Adjustment by user of a time of learning for the automatic programming of the alarms. During this time, the temperature monitoring system (3) will make the measurements and calculation of the differentials of instantaneous and average temperature, registering the reached maximum values.

Adjustment by user of a tolerance margin for the alarm fittings. The alarm values for instantaneous and average differential will be automatically determined by the temperature monitoring system (3) summing this tolerance margin to the maximum values obtained in the item above for the instantaneous and average differentials respectively.

The invention claimed is:

1. "TEMPERATURE MONITORING SYSTEM FOR POWER TRANSFORMERS SUBMERGED IN OIL", adapted for temperature monitoring of power transformers based on temperature measurements of oil, coilings and commuter under load, wherein:

the temperature measurement of the oil is made through two redundant temperature sensors (1A and 1B), wherein the two temperature sensors (1A and 1B) are RTD-type sensors installed near each other in the cover (2A) of the transformer (2), and which are linked to two entrances (3A)of independent measurement in a Temperature Monitor (3).

2. "TEMPERATURE MONITORING SYSTEM FOR POWER TRANSFORMERS SUBMERGED IN OIL", according to claim 1, wherein in normal conditions of operation, both sensors (1A and 1B) measure about the same temperature, and wherein the arithmetic average of the measurements of the two sensors is considered to be the temperature of the oil.

3. "TEMPERATURE MONITORING SYSTEM FOR POWER TRANSFORMERS SUBMERGED IN OIL", according to claims 1 or 2, wherein the Temperature Monitor (3) is programmed such that there is an admissible maximum value for a temperature difference of the two sensors (1A and 1B); if the admissible maximum value for the temperature difference is overtaken it indicates that there are problems in the measurement of one of the sensors (1A or 1B).

4. "TEMPERATURE MONITORING SYSTEM FOR POWER TRANSFORMERS SUBMERGED IN OIL", adapted for temperature monitoring of power transformers based on temperature measurements of oil, coiling and commuter under load, wherein the entrance (3A) of the temperature monitor (3) has a self-calibration system, based on standard utilization of internal calibration to the temperature monitor (3), which consist in resistors (3B) of high precision and stability with known values of resistances, each one of them (3B) corresponding for temperature values distributed inside the measurement scale of monitoring system.

5. "TEMPERATURE MONITORING SYSTEM FOR POWER TRANSFORMERS SUBMERGED IN OIL", adapted for temperature monitoring of power transformers based on temperature measurements of oil, coilings and commuter under load, wherein a toggling system (3C) transfers periodically the temperature measurement of the temperature sensors (1A and 1B) for the calibration resistances (3B), comparing the measurement made in the calibration resistances (3B) with the known value of them, adjusting thus the measurement to the real value of the calibration resistances (3B).

6. "TEMPERATURE MONITORING SYSTEM FOR POWER TRANSFORMERS SUBMERGED IN OIL", adapted for temperature monitoring of power transformers based on temperature measurements of oil, ceilings and commuter under load, wherein the temperature monitoring system (3) has a timing system between activation of cooling groups (4A and 4B), able to avoid the simultaneous activation of these in case of internal failure or alimentation lack, guaranteeing the activation of the second group (4B) with a delay of some seconds regarding the first group (4A).

7. "TEMPERATURE MONITORING SYSTEM FOR POWER TRANSFORMERS SUBMERGED IN OIL", according to claim 6, wherein capacitors (3D) of internal alimentation supply (3E) of the temperature monitor (3) make, in case of lack of external alimentation (5), the tension of internal alimentation of microcontroller (3F) decrease gradually, allowing microcontroller (3F) to detect the alimentation lack (5) before the internal tension lacks completely, and at this time microcontroller (3F) immediately activates the first cooling group (4A), turning off a bobbin of a correspondent relay (3H), and keeping the second cooling group (4B) turned of by keeping a bobbin of a relay (3I) energized, wherein a necessary current for this is supplied by one super capacitor (3J), which has enough capacity to keep the relay (3I) energized for several seconds.

8. "TEMPERATURE MONITORING SYSTEM FOR POWER TRANSFORMERS SUBMERGED IN OIL", according to claim 7, wherein, after de-energizing the relay (3I) of the second cooling group (4B),microcontroller (3F) enters a low consumption mode ("sleep" mode), in order to not unload totally the super capacitor (3J).

9. "TEMPERATURE MONITORING SYSTEM FOR POWER TRANSFORMERS SUBMERGED IN OIL", adapted for temperature monitoring of power transformers based on temperature measurements of oil, ceilings and commuter under load, wherein a system of automatic alternation of the cooling groups (4A and 4B), guarantee uniform use of the cooling equipment without the need of operators human intervention, because every time the cooling groups (4A and 4B) are linked, after have being turned off, the activation order of the cooling groups is inverted, considering a system with just two cooling groups.

10. "TEMPERATURE MONITORING SYSTEM FOR POWER TRANSFORMERS SUBMERGED IN OIL", according to claim 9, wherein in systems with more than two cooling groups (4A and 4B), a sequential activation of the groups initiates, have being turned off, by a subsequent group to a one that had been the first to be activated of an immediately previous time, in a cyclic process.

11. "TEMPERATURE MONITORING SYSTEM FOR POWER TRANSFORMERS SUBMERGED IN OIL", according to claims 9 or 10, wherein in cases when the cooling groups (4A and 4B) remain constantly linked for long periods, a record of time of operation of each group (4A and 4B) is kept, giving priority to activation of a group with smaller time of operation in substitution to a group with larger time of operation.

12. "TEMPERATURE MONITORING SYSTEM FOR POWER TRANSFORMERS SUBMERGED IN OIL", adapted for temperature monitoring of power transformers based on temperature measurements of oil, coilings and commuter under load, comprising: a system for maintenance of a watch (3K) in case of auxiliary alimentation lack (5), without use of internal batteries to the equipment, through use of super capacitors (3J), which are capacitors with high capacity of energy storage, able to supply the necessary energy to keep the watch (3K) in operation during a fault of the auxiliary alimentation tension (5), considering that the temperature monitoring systems (3) are fed with auxiliary tension (5) of high reliability, so that the interruptions in the alimentation are rare and of short duration.

13. "TEMPERATURE MONITORING SYSTEM FOR POWER TRANSFORMERS SUBMERGED IN OIL", adapted for temperature monitoring of power transformers based on temperature measurements of oil, coilings and commuter under load comprising: a system to increase reliability and safety in activation of exit contacts (3L) for alarm and disconnection functions for over-temperature, through utilization of two microcontrollers (3F and 3G), denominated "principal" (3F) and "secondary" (3G), electrically isolated, however making data change to each other by means of photocouplers (3O), and each exit contact (3L) of the temperature monitoring system (3) consists, internally, of two relays (3M and 3N) with their contacts connected in series, being a relay (3M) controlled by principal microcontroller (3F) and the other relay (3N) by secondary microcontroller (3G), so that the shutdown of just one of these relays (3M or 3N) is not enough to cause the shutdown of the exit contact (3L).

14. "TEMPERATURE MONITORING SYSTEM FOR POWER TRANSFORMERS SUBMERGED IN OIL", according to claim 13, wherein there is economic alternative mode, in which secondary microcontroller (3G) only activates the relay (3N), whose contact, when closing, provides the alimentation tension that will allow to the principal microcontroller (3F) to energize the bobbins of several exit relays (3M), thereby avoiding duplication of relays used internally in the temperature monitoring system (3).

15. "TEMPERATURE MONITORING SYSTEM FOR POWER TRANSFORMERS SUBMERGED IN OIL", according to claim 13 or 14, wherein circuits (3P) are projected in a connection of each exit of microcontrollers (3F and 3G) to a coil of the relays (3M and 3N), such that the coils of the relays (3M and 3N) are not energized in a case when a logical level of an exit of microcontrollers (3F and 3G) is continually 0 or 1, the circuits (3P) only energize coils of relays (3M and 3N) when the exit of microcontroller (3F and 3G) has a logical level that alternates continually between 1 and 0 at a pre-determined frequency that only can be obtained if microcontroller (3F and 3G) is operating normally.

16. "TEMPERATURE MONITORING SYSTEM FOR POWER TRANSFORMERS SUBMERGED IN OIL", according to claim 13 or 14 wherein each microcontroller (3F and 3G) make a reciprocal verification of operation principal microcontroller (3F) verifies the secondary microcontroller (3G), and the secondary (3G) verifies the principal microcontroller (3F), detecting through an exchange of data eventual failures in the operation.

17. "TEMPERATURE MONITORING SYSTEM FOR POWER TRANSFORMERS SUBMERGED IN OIL", according to claim 16 wherein once a failure is detected, the microcontroller (3F or 3G) which detected it, makes a "reset" from the other microcontroller (3F or 3G) through a signal sent through one of the photocouplers (3O), the circuits being configured to make the "reset" by means of appropriate inputs for this function in microcontrollers (3F and 3G) or through temporary interruption of alimentation of the microcontrollers (3F and 3G).

18. "TEMPERATURE MONITORING SYSTEM FOR POWER TRANSFORMERS SUBMERGED IN OIL", adapted for temperature monitoring of power transformers based on temperature measurements of oil, windings and commuter under load, wherein: a measurement of a load current of the transformer (2) is made through a current transformer (2B) installed in a bushing of the transformer that is connected to a measurement entrance (3Q) in a temperature monitor (3), and through of this measurement execute a consistency verification algorithm of the temperature measurements based on fact that the temperatures of the oil and of the windings of the transformer (2) are determined mostly by the load current of the transformer.

19. "TEMPERATURE MONITORING SYSTEM FOR POWER TRANSFORMERS SUBMERGED IN OIL", according to claim 18, wherein the consistency verification algorithm considers that a measurement of elevated temperature, above of a limit for operation of an alarm and/or disconnection contacts for over-temperature, to be classified as true only if the load current of the transformer is above a minimum level programmed by user, otherwise indicating that the measurement of high temperature is inconsistent, and blocking the activation of the exit contacts for alarm and/or disconnection of the transformer.

20. "TEMPERATURE MONITORING SYSTEM FOR POWER TRANSFORMERS SUBMERGED IN OIL", according to claim 18 or 19, wherein the consistency verification algorithm is based not only in the instantaneous measurement of the load current, but also in a calculation of an average of this current in a mobile time window programmed by user, so that a measurement of elevated temperature, above of the limit for performance of the alarm and/or disconnection contacts for over-temperature, can only be considered true if the average calculated for the load current of the transformer is above a minimum level programmed by user, and otherwise the algorithm indicates that the measurement of high temperature is inconsistent and to block the activation of the exit contacts for alarm and/or disconnection of the transformer.

21. "TEMPERATURE MONITORING SYSTEM FOR POWER TRANSFORMERS SUBMERGED IN OIL", adapted for temperature monitoring of power transformers based on temperature measurements of oil, windings and commuter under load, wherein an algorithm of Pre-Cooling, in which a measured load current is divided by a nominal current of a transformer and multiplied by 100%, obtaining thus a percentile of current loading of the transformer regarding its nominal current, and soon after, for each cooling group (4A and 4B) a level of percentile load that, when overtaken by the percentile of current load, causes the entrance in operation of a corresponding cooling group.

22. "TEMPERATURE MONITORING SYSTEM FOR POWER TRANSFORMERS SUBMERGED IN OIL", according to claim 21, wherein the algorithm of Pre-Cooling allows an adjustment by user of a hysteresis value for a slop of the cooling groups (4A and 4B), which are turned off only if the current percentile loading of the transformer (2) is reduce to a value lower than an adjustment for entrance in operation of the cooling group less the value of hysteresis, thus avoiding small variations of percentile of load provoking successive starts and stops of the cooling groups (4A and 4B).

23. "TEMPERATURE MONITORING SYSTEM FOR POWER TRANSFORMERS SUBMERGED IN OIL" adapted for temperature monitoring of power transformers based on temperature measurements of oil, windings and commuter under load, wherein a temperature measurement of the commuter under load (6) is made through a sensor (6A) installed in a cover of the commuter (6), in touch with the oil, making a thermal supervision of the commuter through a calculation of a temperature difference between commuter and transformer, then adjusting, a limit value for this difference, which if overtaken it will activate an alarm indicating possible defects in the commuter.

24. "TEMPERATURE MONITORING SYSTEM FOR POWER TRANSFORMERS SUBMERGED IN OIL", according to claim 23, wherein the calculation of the average of the temperature differential between commuter (6) and transformer (2) is made in a mobile time window, the calculation being repeated at a time interval programmed by user, wherein if the average if the temperature differential exceeds a programmed limit value, it will activate an alarm indicating possible defects in the commuter.

25. "TEMPERATURE MONITORING SYSTEM FOR POWER TRANSFORMERS SUBMERGED IN OIL", according to claim 23 or 24, further comprising a system for automatic adjustment of the alarm values of the temperature differential of the commuter (6), through an adjustment by user of a time of learning during which the temperature monitoring system (3) will make the measurements and calculations of differentials of instantaneous and average temperature, registering maximum values reached.

26. "TEMPERATURE MONITOR ING SYSTEM FOR POWER TRANSFORMERS SUBMERGEI) IN OIL", according to claim 25, wherein a user programs a tolerance margin for the alarm adjustments, and the alarm values for instantaneous and average differential are automatically determined by the temperature monitoring system (3) summing this tolerance margin to the maximum values reached for the instantaneous and average differentials respectively.

* * * * *

UNITED STATES PATENT AND TRADEMARK OFFICE
CERTIFICATE OF CORRECTION

PATENT NO. : 8,441,358 B2
APPLICATION NO. : 12/531623
DATED : May 14, 2013
INVENTOR(S) : Eduardo Pedrose Santos It is certified that error appears in the above-identified patent and that said Letters Patent is hereby corrected as shown below:

In the Claims:

Col. 11, Claim 6, Line 19:
DELETE after oil "ceilings"
ADD after oil --coilings--

Col. 11, Claim 7, Line 37:
DELETE after turned "of"
ADD after turned --off--

Col. 11, Claim 9, Line 50:
DELETE after oil "celings"
ADD after oil --coilings--

Col. 11, Claim 9, Line 53:
DELETE after of "operators"
ADD after of --operators'--

Col. 11, Claim 10, Line 62:
ADD before have --after--

Col. 14, Claim 22, Line 8:
DELETE after for a "slop"
ADD after for a --stop--

Signed and Sealed this
Twenty-fifth Day of June, 2013

Teresa Stanek Rea
*Acting Director of the United States Patent and Trademark Office*